United States Patent
Knierim

(10) Patent No.: US 9,925,773 B2
(45) Date of Patent: Mar. 27, 2018

(54) TIN-SILVER DIFFUSION SOLDERING FOR THIN JOINTS WITHOUT FLUX

(71) Applicant: XEROX CORPORATION, Norwalk, CT (US)

(72) Inventor: David L. Knierim, Wilsonville, OR (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/184,447

(22) Filed: Jun. 16, 2016

(65) Prior Publication Data
US 2017/0361615 A1    Dec. 21, 2017

(51) Int. Cl.
*B41J 2/14*    (2006.01)
*B23K 1/00*    (2006.01)

(52) U.S. Cl.
CPC ............. *B41J 2/14274* (2013.01); *B23K 1/00* (2013.01)

(58) Field of Classification Search
CPC ............................. B41J 2/14274; B23K 1/00
See application file for complete search history.

(56) References Cited

U.S. PATENT DOCUMENTS

2002/0066524 A1* 6/2002 Kagawa ............... B41J 2/14233
156/235
2006/0050109 A1* 3/2006 Le .......................... B41J 2/161
347/47

* cited by examiner

*Primary Examiner* — Geoffrey Mruk
(74) *Attorney, Agent, or Firm* — Marger Johnson

(57) ABSTRACT

A method of bonding two components includes plating a first of the components with a first silver layer, a tin layer, and a second silver layer, plating a second of the components with silver, inserting the first and second components into a pre-heated press, and applying pressure to the components causing the components to bond. A stack of layers has a first component layer, a first silver layer, a tin layer, a second silver layer, a second component silver layer, and a second component layer.

9 Claims, 3 Drawing Sheets

TIN-SILVER DIFFUSION SOLDERING FOR THIN JOINTS WITHOUT FLUX

FIELD OF THE INVENTION

This disclosure relates to ink jet manufacture, more particularly to bonding piezoelectric actuators to jet stack plates.

BACKGROUND

Some ink jet print heads consist of stacks of steel or a mix of steel and polymer plates. The stack of plates form reservoirs and ink paths to route ink from a main reservoir to a nozzle plate. Typically, an actuator of some kind draws ink into a pressure chamber next to the nozzle plate and then pushes the ink out through the nozzles.

An example of an actuator consists of a piezoelectric actuator (PZT) that causes a diaphragm plate in the stack to flex and both pull ink into the reservoir and force it out through the nozzles. In some ink jet print heads, slabs of nickel plated PZT material are kerfed into individual actuators and epoxy-bonded to the diaphragm on the back side of the print head jet stacks. The epoxy used in production degrades at operating temperatures when exposed to air.

One possible approach uses tin-silver soldering but existing variants have too thick a bond line for many ink jet print heads. Typically, diffusion-soldered bonds are 50 to 100 micrometers thick. This thick of a bond degrades performance of the print head when inserted between a 50 micrometer PZT slice and a 20 micrometer diaphragm. Thinning will not work because the tin layer becomes too thin to break up and contain the natural oxide layer that forms on tin surfaces. The use of flux can cause problems because it either gets caught in the bond layer or may contaminate the print head.

SUMMARY

An embodiment is a method of bonding two components including plating a first of the components with a first silver layer, a tin layer, and a second silver layer, plating a second of the components with silver, inserting the first and second components into a pre-heated press, and applying pressure to the components causing the components to bond.

Another embodiment is a stack of layers having a first component layer, a first silver layer, a tin layer, a second silver layer, a second component silver layer, and a second component layer.

Another embodiment is an apparatus having a first component, a bond layer consisting of silver and tin bonded to the first component having a thickness less than 50 micrometers, and a second component bonded to the bond layer on a side of the bond layer opposite to the first component.

DETAILED DESCRIPTION OF THE EMBODIMENTS

Conventional tin-silver diffusion soldering uses a tin preform in the form a thin sheet, between two silver-plated parts. Tin plating on one part has also been done before. Silver over tin has rarely if ever occurred before, nor have layers of tin-silver-tin significantly below 50 micrometers occurred. Using thin layers presents several challenges, among them the fact that the tin may diffuse into the silver before the two layers can be heat bonded. Additionally, plating silver over tin requires great care to keep the tin from oxidizing prior to plating.

For print heads, one component or part consists of a layer of steel and the other component or part consists of a piezoelectric (PZT) layer separated from each other. The discussion here focuses on plating of these layers, but one should understand that the plating process may be applied to any two layers. The process may plate either one of the components first, or may plate them simultaneously. Similarly, one component will receive a silver/tin/silver plating, and the other will receive a silver plating. In the following discussion, the silver/tin/silver plating will be applied to the PZT and the steel layer will receive the silver plating. However, the reverse may also be true. The selection of the components will depend on the system being manufactured. The selection of which component receives which coating is left up to the system designer and the manufacturing process.

Figure 1:
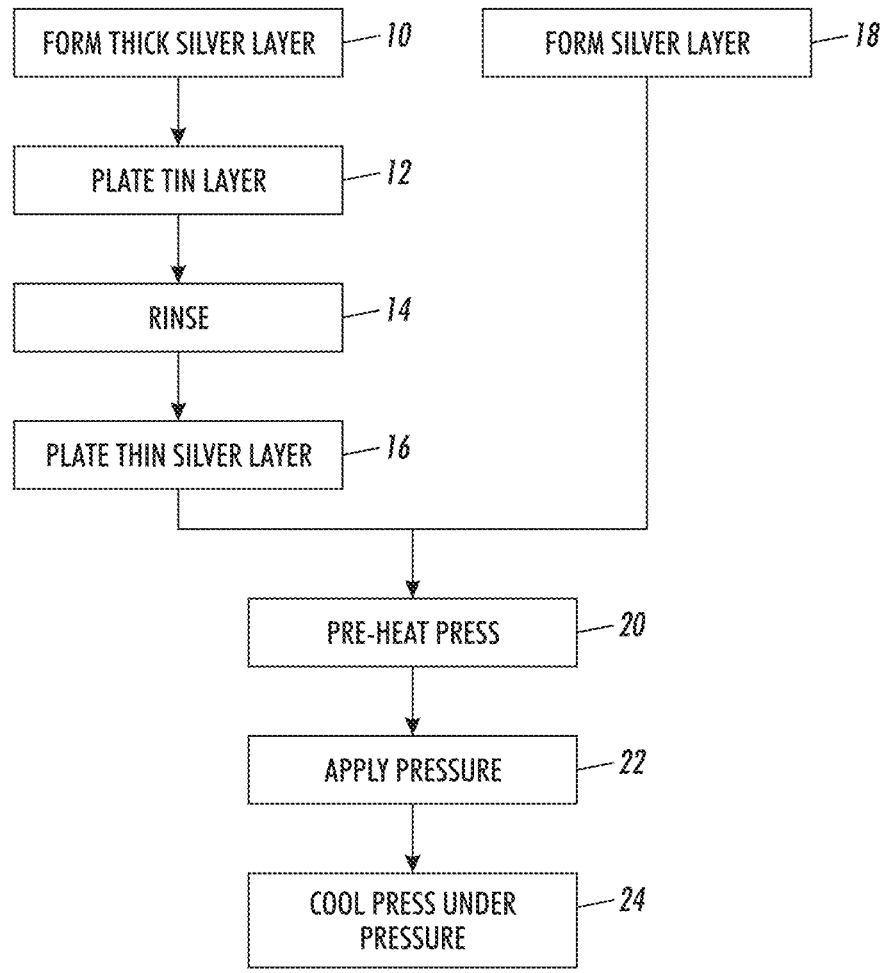
FIG. 1 shows a flow chart of one embodiment of a method of tin-silver diffusion soldering.

FIG. 1 shows an embodiment of a process to plate two different components with tin-silver. On the left side of the flow chart, the process shows the steps to perform the silver-tin-silver plating and the right side the steps for silver plating the other component. As discussed above, in the example below, the silver-tin-silver plating was performed on the piezoelectric component and the silver plating alone was performed on a stainless steel membrane or diaphragm. The reverse may also be true, and this process may be used on other components. Both components may also undergo initial processing to form a 'nickel strike.' A nickel strike typically consists of a thin layer of nickel formed on the surface of a component to allow the silver to 'stick' or bond to the surface. This may or may not be needed, depending upon the components used.

The process forms a first, 'thick' silver layer at 10, where the term 'thick' is relative to the second silver layer. In the experiment, this layer is 6 micrometers thick and is formed by plating. After plating the first, thick silver layer, the component moves to the tin plating. The tin plating may be accomplished by matte plating using a hot solution of sodium stannate (Na2Sn(OH)6) and potassium hydroxide (KOH). The silver layer receives a 2.5 micrometer thick layer of tin at 12, in one embodiment. After the tin plating bath, the component undergoes a water rinse, in one embodiment for 5 seconds at 14. The component then moves quickly to the silver plating bath and the current is immediately turned on to plate the second layer of silver at 16. The second, thin layer of silver consists of a layer thin enough to conform to the PZT roughness when the tin melts, but thick enough to prevent oxidation of the tin layer.

As mentioned above, oxidation of the tin may cause problems. One aspect of the process that may help with that lies in the use of an acidic silver plating bath. In one experiment, the silver plating bath comprised 0.37 g AgNO3 (silver nitrate)+9 g KI (potassium iodide)+1.2 g citric acid (C6H8O7)+20 g water. Some embodiments also included 1.2 g of 10M HCl (hydrochloric acid). While the make-up of this plating bath works to remove a thin oxide layer on the tin during plating of the second (thin) silver layer, using the same bath for both silver layers makes the process more efficient. One should note that the term 'same bath' may mean they were plated in the same exact bath, or that they were plated in two different plating bath apparatuses but with the same chemical make-up. Additionally, the plating of the first silver layer may occur in a more conventional silver bath, such as a cyanide-based bath. This would result in two silver baths.

On the other side of the process, the other component also has a silver layer at 18. In the embodiment where the silver-tin-silver process occurs on the diaphragm, the process may not have to perform plating of the PZT, as vendors offer PZT components with a 1 micrometer thick layer of silver. Otherwise, the PZT or diaphragm would have to receive a layer of silver. This may occur in the same bath as the first and second silver layers, or in the same bath as the first silver layer, or in its own bath, making a total of three silver baths.

Once both components have received their plated coatings, a heated press bonds them together. The discussion mentioned above that the heating of the layers must occur rapidly to avoid the tin diffusing into the silver. The tin must melt before completely diffusing in order for it to flow into voids in the bond caused by surface roughness. One embodiment heats the press prior to insertion of the components at 20. The press then applies pressure at 22 to bond the two components together, and then the components cool while still under pressure at 24. These last steps will be discussed in more detail further.

Figure 2:
FIGS. 2-7 show embodiments of a device manufactured using tin-silver diffusion soldering.
Figure 3:
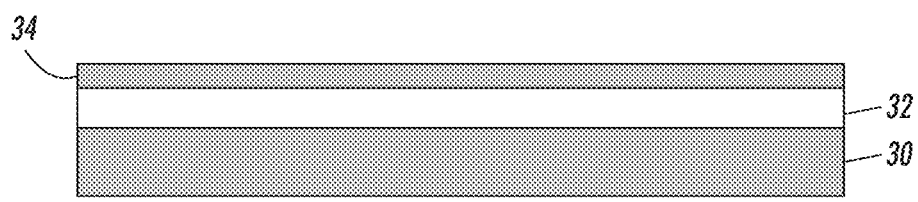
Figure 4:
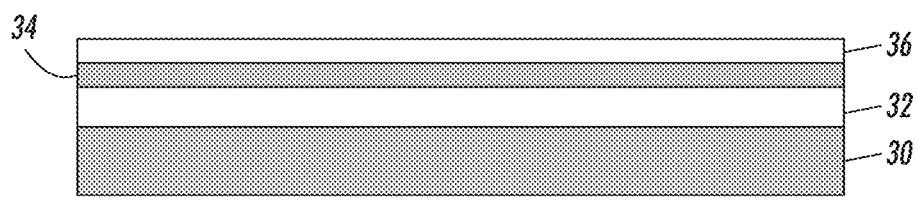

FIGS. 2-7 show side views of the silver-tin-silver layers on one of the components as well as both components in the pressing process. In FIG. 2, the component 30 has received the first, thick layer of silver 32. In FIG. 3, the tin layer 34 has been plated onto the first layer of silver 32. After a water rinse, the component 30 has received the second, thin layer of silver 36. At this point, the component is ready to be bonded to the other component in the heated press.

Figure 5:
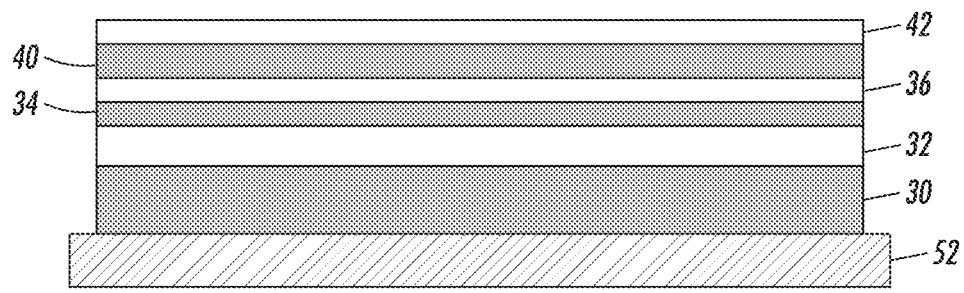
Figure 6:
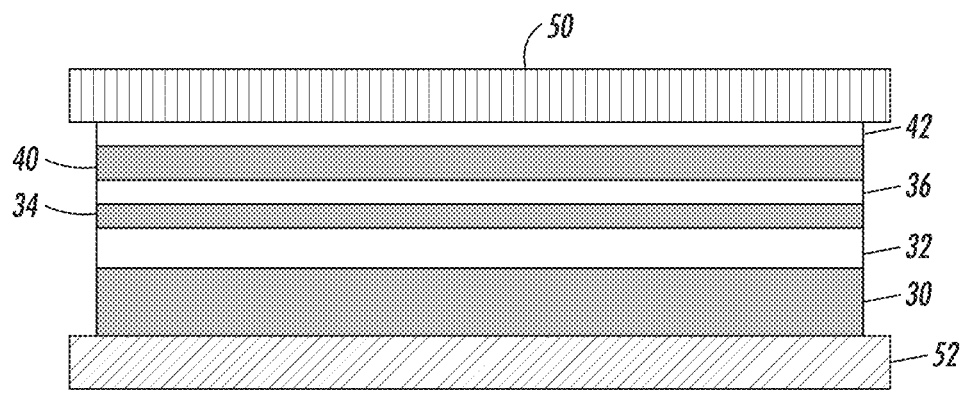

FIG. 5 shows a platen 52. For the embodiments here, the platen is stainless steel, but any type of platen that can be heated may be used. In FIG. 5, prior to placement of the stack, the press's 6.5 millimeter stainless steel platen was heated to about 300 degrees C. The plated stack, which has a thickness of 0.75 mm in some embodiments and consists of the PZT and the diaphragm with their respective layers, was placed on the heated platen. In this example, the top of the press consists of a rubber pad 50 shown in FIG. 6. The press was then closed and 200 PSI of pressure was applied.

After applying the pressure, the process may allow the platen to cool while under pressure. In the example here, the platen cooled to about 260 C shortly after applying pressure as the parts and rubber pad 50 absorbed heat. In one embodiment, the platen was allowed to cool for 30 minutes under pressure, but that is an optional step. In addition, preheating the rubber pad or other upper part of the press would increase the temperature heat ramp as well as slow the heat absorption under pressure.

Figure 7:
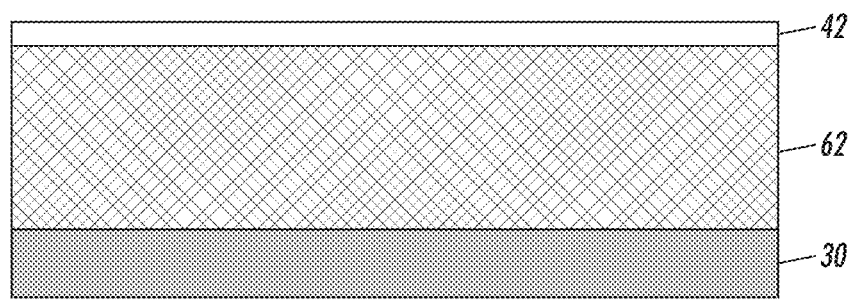

The FIG. 7 shows the resulting structure 60. The structure consists of a stack of heat-bonded layers including: a first component, a bond layer 62, and the second component 42. During the heat and pressure bonding, the first silver layer 32, tin layer 34, second silver layer 36, and the second component silver layer 40 form the bond layer, with the tin diffusing into the silver. The overall thickness of the tin-silver bond layer will be close to the sum of their original layers. In this embodiment, discussed above, the first silver layer is 6 micrometers, the tin layer is 2.5 micrometers, the second silver layer is 0.5 micrometers, and the other component silver layer is 1 micrometer, resulting in a final bond layer thickness of approximately 10 micrometers. In one embodiment, the tin layer is 3.5 micrometers thick, resulting in a 11 micrometer bond layer thickness. In either case, the bond layer is well under 50 micrometers, while current tin-silver bonding layers are typically much thicker. Further, the overall thickness of the silver-tin-silver layers is well under 50 micrometers.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A stack of layers, comprising:
   a first component layer;
   a bond layer on the first component layer, comprising:
      a first silver layer on the first component layer;
      a tin layer on the first silver layer;
      a second silver layer on the tin layer, wherein the second silver layer is thinner than the first silver layer;
      a second component silver layer on the second silver layer; and
   a second component layer on the bond layer.

2. The stack of layers of claim 1, wherein one of the first and second component layers comprises a piezoelectric component.

3. The stack of layers of claim 2, wherein another of the first and second component layers comprises a stainless steel diaphragm.

4. The stack of layers of claim 1, wherein the layers are heat bonded together.

5. The stack of layers of claim 1, wherein the first silver layer, the tin layer and the second silver layer have a thickness of less than 50 micrometers.

6. The stack of layers of claim 1, wherein the second silver layer has a thickness of less than or equal to 1 micrometer.

7. The stack of layers of claim 1, wherein the second component silver layer has a thickness of 1 micrometer.

8. An apparatus, comprising:
   a first component;
   a bond layer consisting of a first layer of silver, a layer of tin on the first layer of silver, and a second layer of silver on the layer of tin, wherein the second layer of tin is thinner than the first layer of silver, the bond layer bonded to the first component having a thickness less than 50 micrometers; and
   a second component bonded to the bond layer on a side of the bond layer opposite to the first component.

9. The apparatus of claim 8, wherein the bond layer has a thickness of less than or equal to 11 micrometers.

* * * * *